US008639739B1

(12) United States Patent
Pope et al.

(10) Patent No.: US 8,639,739 B1
(45) Date of Patent: Jan. 28, 2014

(54) USE OF PEER-TO-PEER TEAMS TO ACCOMPLISH A GOAL

(75) Inventors: Elmore Eugene Pope, Sammamish, WA (US); Christopher L. Scofield, Seattle, WA (US); Bradley E. Marshall, Bainbridge Island, WA (US); Eric B. Merritt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1137 days.

(21) Appl. No.: 11/965,249

(22) Filed: Dec. 27, 2007

(51) Int. Cl.
*G06F 15/16* (2006.01)
(52) U.S. Cl.
USPC ............ 709/201; 709/204; 709/206; 709/207
(58) Field of Classification Search
USPC .................................................. 709/204–207
See application file for complete search history.

(56) References Cited

U.S. PATENT DOCUMENTS

| | | | |
|---|---|---|---|
| 6,371,855 B1 * | 4/2002 | Gavriloff | 463/42 |
| 6,496,812 B1 * | 12/2002 | Campaigne et al. | 706/16 |
| 7,321,928 B2 * | 1/2008 | Feltin et al. | 709/223 |
| 7,519,539 B1 * | 4/2009 | Fliess et al. | 705/301 |
| 7,555,517 B2 * | 6/2009 | Kreiner et al. | 709/203 |
| 2002/0133017 A1 * | 9/2002 | Lange et al. | 546/282.4 |

* cited by examiner

*Primary Examiner* — Minh-Chau Nguyen
(74) *Attorney, Agent, or Firm* — Thomas | Horstemeyer, LLP

(57) ABSTRACT

Disclosed are various embodiments involving the use of peer-to-peer teams to accomplish a goal. The specification of a joint goal for a peer-to-peer team is facilitated in a given peer, where the peer-to-peer team includes a plurality of peers. Also, communication is facilitated between respective pairs of the peers via a peer-to-peer network. A team control packet is maintained in each peer to indicate a performance of each peer in the peer-to-peer team. Also, the implementation of a plurality of tasks associated with respective ones of the peers is tracked, where the tasks are implemented in concert to achieve the joint goal.

24 Claims, 7 Drawing Sheets

USE OF PEER-TO-PEER TEAMS TO ACCOMPLISH A GOAL

BACKGROUND

Centralized systems that facilitate coordination between networked devices to pursue a goal can be vulnerable to failure due to their centralized nature. Specifically, if connectivity between centralized servers or other devices and members of a team working toward a goal is lost, then the goal cannot be properly pursued. Also, it may be inefficient to force every member of a team to communicate with a centralized system.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
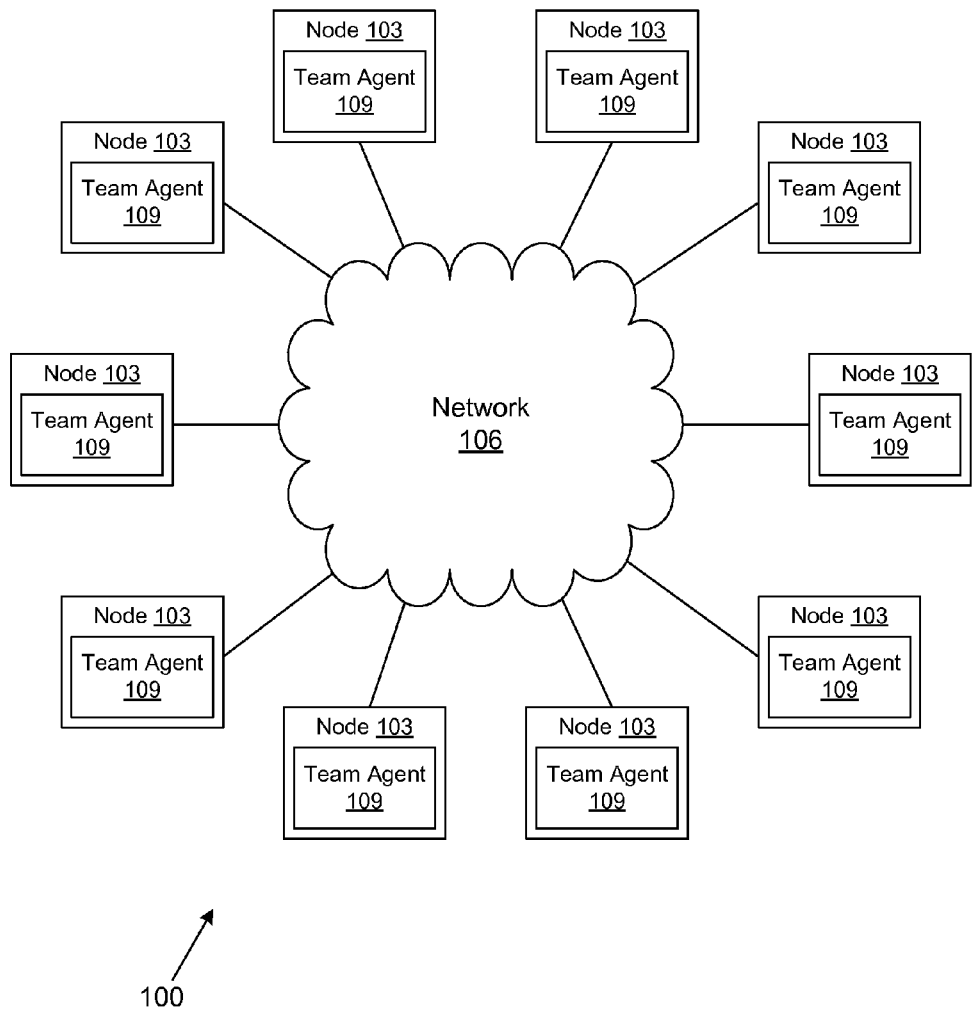
FIG. 1 is a drawing of a peer-to-peer network according to an embodiment of the present disclosure.

With reference to FIG. 1, shown is a peer-to-peer network 100 according to the various embodiments of the present disclosure. The peer-to-peer network 100 includes a plurality of nodes 103 that are coupled together via a network 106. Each of the nodes 103 comprises a peer within the peer-to-peer network 100. To this end, each of the nodes 103 may comprise, for example, a processor based system such as a computer system, a personal digital assistant, a server, or other system with like capabilities. Also, the network 106 may comprise, for example, the Internet, intranets, wide area networks (WANs), local area networks, wireless networks, or other suitable networks, etc., or any combination of two or more such networks.

Executed on each of the nodes 103 is a team agent 109. The team agent 109 is a peer-to-peer team application that is implemented on the respective nodes 103 so that each of the nodes 103 can participate in a peer-to-peer team that operates to achieve a joint goal as will be described.

Although a limited number of nodes 103 are shown in FIG. 1 as included in the peer-to-peer network 100, there may be any number of nodes 103 in the peer-to-peer network 100. Each of the nodes 103 may have, for example, a unique address on the network 106. By virtue of the addresses, each of the nodes 103 can communicate with every one of the other nodes 103 coupled to the network 106.

To implement communication between the nodes 103, according to one embodiment, the team agents 109 executed within each node 103 may be configured to pass messages directly to each other (i.e. peer-to-peer). In one embodiment, each node 103 is configured to maintain an indication such as an address of the other nodes 103 within the network 100 that comprise "peers" with which the team agent 109 can communicate. For example, the team agent 109 within each node 103 may be configured to maintain the indication of the other nodes 103. The indication of the nodes 103 may be stored within a given node 103 within a table or other suitable data structure as can be appreciated.

It is typically the case that a given node 103 in the peer-to-peer network 100 only "knows" about a limited number of nodes 103. This may be the case, for example, because the limited number of nodes 103 are the only nodes 103 with which the given node 103 communicates for various purposes. As such, the given node 103 may have stored within an appropriate table or other data structure the network addresses or other identifying information of the respective nodes 103 that are peers to such node 103. As such, each node 103 may generate and send messages only to the nodes 103 that are its peers which are the nodes 103 of which it is aware based upon having identifying information for such peer nodes 103.

The address information or other identifying information of respective nodes 103 that is maintained by a given node 103 may be entered into a respective node 103 over time by a user. Alternatively, the addresses or other indication of peer nodes 103 may be discovered based upon communication of a given node 103 with other devices on the network 100. Still further, various applications may be implemented in the nodes 103 that facilitate discovery of other nodes 103 on the peer-to-peer network 100.

It is noted that, as a peer-to-peer network 100, the relationships among various nodes 103 within the network 100 do not necessarily bear a correspondence to physical relationships that may exist among various ones of the nodes 103. That is to say, the nodes 103 are configured as "logical peers" within the network 100 and are logically proximate within the network 100, but may be either physically close or physically distant.

Nodes 103 that are configured as peers with respect to each other may directly exchange messages with one another without such messages passing through other nodes 103 on the network 100. Alternatively, messages between respective nodes 103 may actually pass through other ones of the nodes 103 that act as intermediate devices between respective pairs of nodes 103. Communications between respective nodes 103 may be implemented by various physical layer systems and may exhibit varying degrees of latency and bandwidth based upon the underlying physical network and physical protocols that may be employed. In this respect, protocols employed between nodes 103 may comprise, for example, the Internet Protocol (IP) or other appropriate protocols as can be appreciated.

Figure 2:
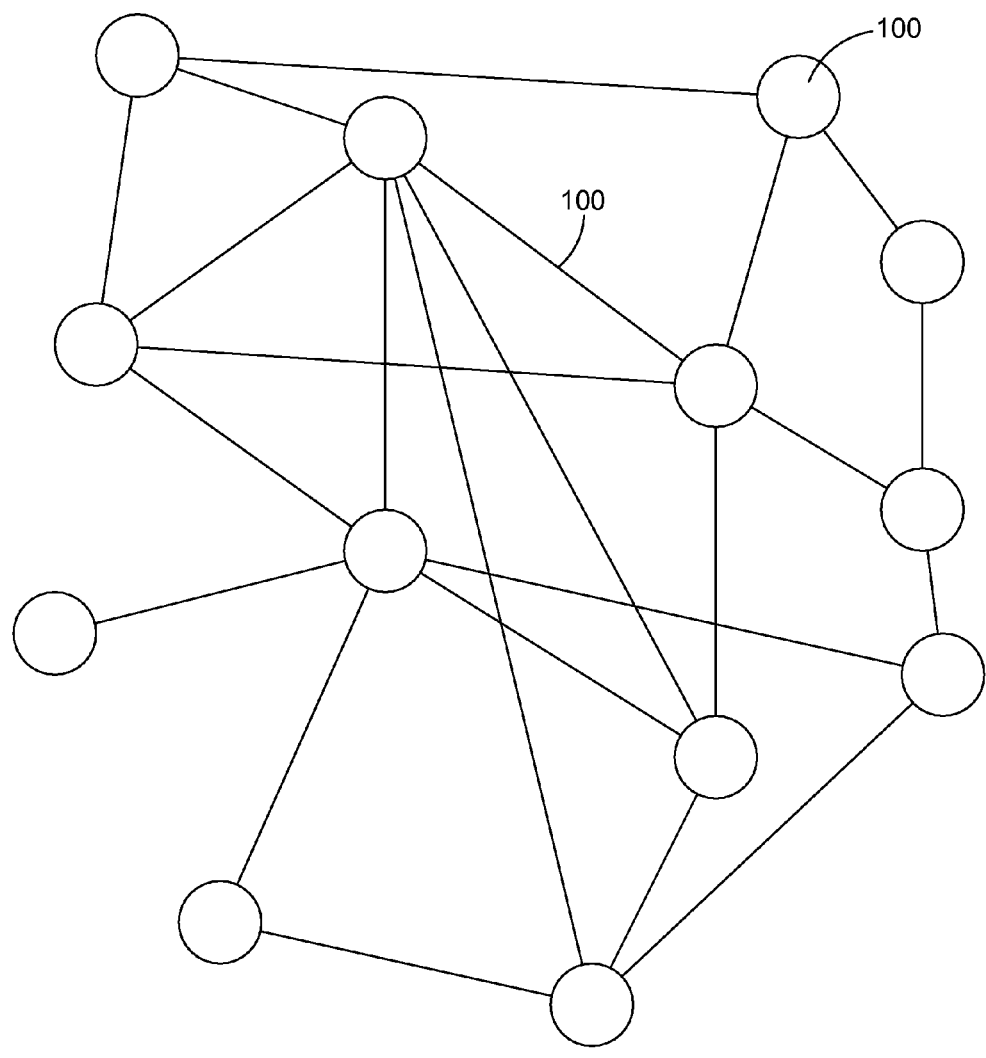
FIG. 2 is a drawing of communication pathways between nodes in the peer-to-peer network of FIG. 1 according to an embodiment of the present disclosure.

With reference next to FIG. 2, shown is an alternate view of the peer-to-peer network 100 that illustrates relationships 113 between the respective ones of the nodes 103. In particular, each circle represents a given one of the nodes 103 (FIG. 1). The lines between the nodes 103 represent relationships 113. Nodes 103 are related to each other when they "know" about each other in that they have identification information such as an address that they may use to send a message to a respective other node 103.

The configuration of relationships 113 with respect to a given node may be derived in any suitable fashion. For example, a user corresponding to a particular node 103 may explicitly specify the one or more peer nodes 103 to which the user wishes to be connected via the network 100. In this respect, the user may specify nodes 103 by using identifiers corresponding to the respective users of such nodes 103 such as user names, e-mail addresses, or other suitable identifiers. Alternatively, each of the nodes 103 may have a network address on the peer-to-peer network 100 as can be appreciated. In an additional alternative, a given node 103 may be configured to automatically identify potential peer nodes 103 on the basis of networks or relationships to which the user of a given node belongs.

For example, each node 103 may be configured to implement functionality to identify peer nodes 103 based upon the user contacts as reflected in an e-mail application address book, contact manager, or other application contained within a node 103. Also, a user's membership in a social network (such as FACEBOOK™ or MYSPACE™), membership in a common organization (such as a common employer, school, or other organization), or any other suitable basis may be employed.

Also, establishing a relationship 113 between respective pairs of nodes 103 may be dependent upon obtaining consent of one or both of the users corresponding to the respective nodes 103. For example, each node 103 may implement an application that may be configured to present an interactive user interface such as a dialog box or other prompt through which a user may influence node behavior to provide such consent, etc. According to other embodiments, each node 103 may be configured to take automatic action to establish relationships 113 with other nodes 103 without requiring user approval.

Each node 103 may accumulate a significant number of relationships 113 with other nodes over time as the node 103 is made aware of new peer nodes 103 with which it can establish a relationship. In this sense, the relationship 113 comprises the ability of two respective nodes 103 to have the requisite information about other nodes 103 so as to be able to communicate with each other.

The peer-to-peer network 100 can facilitate the proliferation of messages and content throughout the entire network by virtue of the relationships 113 between respective nodes 103. For example, assume that a given message generated by one of the nodes 103 is to be communicated to all of the other nodes 103 in the peer-to-peer network 100. A first node 103 may generate the message and send it to each of the peer nodes 103 with which the originating node 103 has a relationship 113. In this sense, the originating node 103 sends the message to those peer nodes 103 for which the originating node 103 has an appropriate network address or other identification information.

Thereafter, each of the recipients of the message forwards the message to those nodes with which the recipient has a relationship 113. This pattern occurs from node to node until each of the nodes 103 has received the message. If the message finds its way back to a node 103 that has already received the message, then it may ignore the message, for example, given that such a node 103 will already have transmitted the same message to each of its peer nodes 103. In this sense, nothing is gained by forwarding a message further by such a node 103. Thus, according to the above principles, messages can proliferate among almost all of the nodes 103 within a given peer-to-peer network 100.

With the foregoing discussion in mind, we refer back to FIG. 1 to describe the operation of the team agents 109 in facilitating participation of each of the nodes 103 in a peer-to-peer team according to the various embodiments of the present disclosure. The team agents 109 facilitate establishing a joint goal for a peer-to-peer team, where a peer-to-peer team includes a number of peers that comprise respective ones of the nodes 103 that communicate with each other in achieving a joint goal. To this end, the team agents 109 facilitate communication between respective peers of the peer nodes 103 via the peer-to-peer network 100. While the peer-to-peer team is pursuing the joint goal, each team agent 109 creates and maintains a team control packet that indicates a performance of each of the peer nodes 103 in the peer-to-peer team. Also, each team agent 109 tracks the implementation of tasks that are associated with the other ones of the peers on the peer-to-peer team. Such tasks are implemented in concert to achieve the joint goal established by an originating one of the team agents 109.

Each team agent 109 is configured to originate a peer-to-peer team. To this end, each of the team agents 109 is configured to allow an originating node 103 to specify a team identifier for the peer-to-peer team. This team identifier will be used by all of the peer nodes 103 that are included in the peer-to-peer team to associate themselves with the peer-to-peer team itself. Each team agent 109 is further configured to establish the joint goal of the peer-to-peer team. In this respect, each team agent 109 facilitates the input by a user of the joint goal to be accomplished by the peer-to-peer team.

In order to establish the peer-to-peer team, according to one embodiment, a given one of the team agents 109 extends an invitation to remaining or other ones of the peers as represented by the nodes 103 in the peer-to-peer network 100 to participate in the peer-to-peer team. The invitation may be extended to other ones of the nodes 103 by propagation through the peer-to-peer network 100 as described above with reference to FIG. 2.

In particular, respective nodes 103 upon receiving an invitation may act upon it themselves and may pass it on to the other nodes 103 of which they are aware by virtue of the fact that they have identification information for such other nodes 103. In one embodiment, the invitation is extended only to certain ones of the nodes 103 within the peer-to-peer network 100. As such, the invitation may specify whether peer nodes 103 should pass the invitation on to other nodes 103 or whether it is intended for them alone. Alternatively, an invitation can be configured to propagate indiscriminately throughout the peer-to-peer network 100 inviting all nodes 103 without restriction, where any node 103 may relay an acceptance to such invitation and join the peer-to-peer team.

The invitation may specify the specific role that a given node 103 receiving the invitation is to play in the peer-to-peer team. That is to say that the invitation may specify the task that is to be performed by the respective peer node 103 that accepts the invitation. Alternatively, the invitation generated by the originating peer node 103 may allow a given peer node 103 that receives the invitation to select a respective one of a plurality of tasks to perform in achieving the joint goal. As such, upon accepting the invitation, a given peer node 103 would select the respective one of the tasks that they wish to perform as a member of the peer-to-peer team.

The team agent 109 in each of the nodes 103 is also configured to allow a given user to manipulate the team agent 109 to accept the invitation from another peer node 103 to join a peer-to-peer team. In one embodiment, when an invitation is accepted, a team agent 109 sends a message to all other peer nodes 103 that are currently included in the peer-to-peer team informing such nodes 103 of the acceptance of the invitation by the respective peer node 103. In this manner, all peer nodes 103 that are currently on a peer-to-peer team are made aware of new arrivals to the team and the roles that they are to play.

When a given peer node 103 joins a peer-to-peer team, the team agent 109 is configured to display a status of each of the peer nodes 103 included in the peer-to-peer team in performing a respective one of the tasks that are implemented in achieving the predefined joint goal. Thus, the display facilitates promoting awareness among the members of a peer-to-peer team as to the progress of each individual peer node 103 in performing a respective task to achieve the joint goal.

It may be the case that some peer nodes 103 performing respective tasks for a peer-to-peer team may perform poorly or not at all. Such peer nodes 103 may actually hinder the progress of the peer-to-peer in achieving the goal. Accordingly, the team agents 109 are configured to facilitate cooperation among the peer nodes 103 included in the peer-to-peer team to eliminate a peer from the peer-to-peer team. To this end, the team agents 109 are each configured to allow messages to be sent amongst respective other peer nodes 103 on the peer-to-peer team (except for the poorly performing node 103) suggesting that the poorly performing member of the peer-to-peer team be eliminated due to poor performance. The various team agents 109 are also configured to provide a user interface component or other interface to indicate agreement that a given peer should be eliminated from the peer-to-peer team. A requirement may be set forth that all of the members of the peer-to-peer team, or a threshold number of the members of the peer-to-peer team must agree before eliminating a poorly performing peer node 103.

Alternatively, a single peer node 103 may be designated as a team leader that retains the sole right to eliminate any other peer node 103 from a peer-to-peer team for any particular reason such as poor performance, behavioral issues, and/or other reasons. In addition, the team agents 109 may include various communication windows by which poorly performing team members may be made aware of dissatisfaction with their lack of effort in an attempt to get them to increase their performance.

In one embodiment, each of the peer nodes 103 performs a respective one of the tasks to achieve the joint goal, where the task they perform is independent of the performance of other tasks by other ones of the peer nodes 103 included in the peer-to-peer team. In this respect, when a given peer node has completed their task, then their role is finished on the peer-to-peer team. Such a peer node 103 will have to wait for the performance of the other peer nodes 103 to finish their tasks to complete the joint goal.

Alternatively, each of the peer nodes 103 may perform a respective one of the tasks in cooperation with the performance of tasks by other ones of the peer nodes 103 within the peer-to-peer team. In such case, such tasks are interdependent. For example, one peer may perform a given task up to a point that requires the input based upon the performance of a task by another peer node 103. As such, the performance of the peer node 103 may be effectively placed on hold until the other peer node 103 provides needed information based upon the performance of its own task. Such is an example of how peers may perform tasks in cooperation with each other.

The various tasks that may be performed by a given peer-to-peer team can vary widely. For example, one joint goal may be to perform research for financial transactions or investing. In such respect, various peer nodes 103 may be assigned different aspects of the research to be performed based upon the skills and qualifications of the users of such peer nodes 103. Additionally, individuals taking part in an online game involving a virtual world may establish a team to facilitate their participation in the game. Also, there may be many other applications for a peer-to-peer team as described herein. Accordingly, the tasks assigned to each of the members of a peer-to-peer team may be any tasks needed to accomplish a joint goal as can be appreciated.

During the implementation or performance of the given tasks by the respective peer nodes 103, the individual peer nodes 103 may periodically communicate with each other so as to inform each other as to the status of the respective tasks performed. In this respect, information about the performance of the respective tasks such as the progress made and other information may be provided. In one embodiment, each of the team agents 109 is configured to send a status request generated in a respective one of the peer nodes 103 to the remaining ones of the peer nodes in the peer-to-peer team informing such remaining peer nodes 103 as to the status of the performance in the respective peer node 103.

Alternatively, each of the team agents 109 may be configured to periodically send a status request to all of the other peer nodes 103 in a given peer-to-peer team to obtain the status of the performance of the respective tasks in each of the remaining ones of the peers. As an additional alternative, each of the team agents 109 may be configured to send a status report indicating the progress of the sending peer node 103 in accomplishing the task assigned thereto. By virtue of status requests or status reports, the team agents 109 of respective peer nodes 103 on the peer-to-peer team can effectively synchronize the information contained in their respective team control packets.

When a given team agent 109 sends information to any other peer node 103 as to the status of the task implemented thereon, according to one embodiment, the team agent 109 includes a time stamp with such status information so that a receiving peer node 103 can keep track of the most up-to-date information. In this manner, each peer node 103 on the peer-to-peer team can most accurately track the progress of each of the nodes 103 in performing their tasks on the peer-to-peer team.

During the course of pursuing the joint goal, the team agents 109 may also be configured to send a request to another one of the peer nodes 103 for predefined data needed to perform a respective one of the tasks. The team control packet maintained within each of the nodes 103 may be used to store the current progress of the given node 103 in performing the given task. Also, the team control packet may be employed to store information about the progress of other peer nodes 103 in achieving their respective assigned tasks.

Each of the team agents 109 is also configured to provide for feedback for respective peer nodes 103 after the completion of a given joint goal or during the course of performing various tasks in achieving a given joint goal. In this respect, the team agent 109 may present various user interfaces for users of respective peer nodes 103 to generate feedback that is automatically transmitted to a respective one of the other nodes 103. Such feedback may be made known to the user of the node 103 that receives such feedback, or may remain hidden from such user to be divulged to future potential team members. This will prevent individuals from joining teams with other individuals that are consistently poor performers.

Also, the performance feedback may be stored in the originating peer node 103 for future reference in engaging with such peer nodes 103 in the future. For example, if one receives an invitation to join a peer-to-peer team, the team agent 109 can automatically examine the feedback stored within the given peer node 103 receiving the invitation to determine whether anyone listed as a potential team member in the invitation with which the user may not wish to be aligned. In this respect, the invitation may list the peer nodes that have specifically been invited to join the peer-to-peer team so that such automated comparison may be implemented.

In such case, the team agent 109 may generate a warning message that is displayed for a user of a given node 103 when an invitation relates to a team that potentially may include or includes an individual with which a given user of a peer node 103 does not wish associate. Note that there also may be many other approaches to providing, storing, or maintaining feedback for respective peer nodes 103 in the peer-to-peer network 100, wherein the description of the feedback herein is provided as an example.

Figure 3:
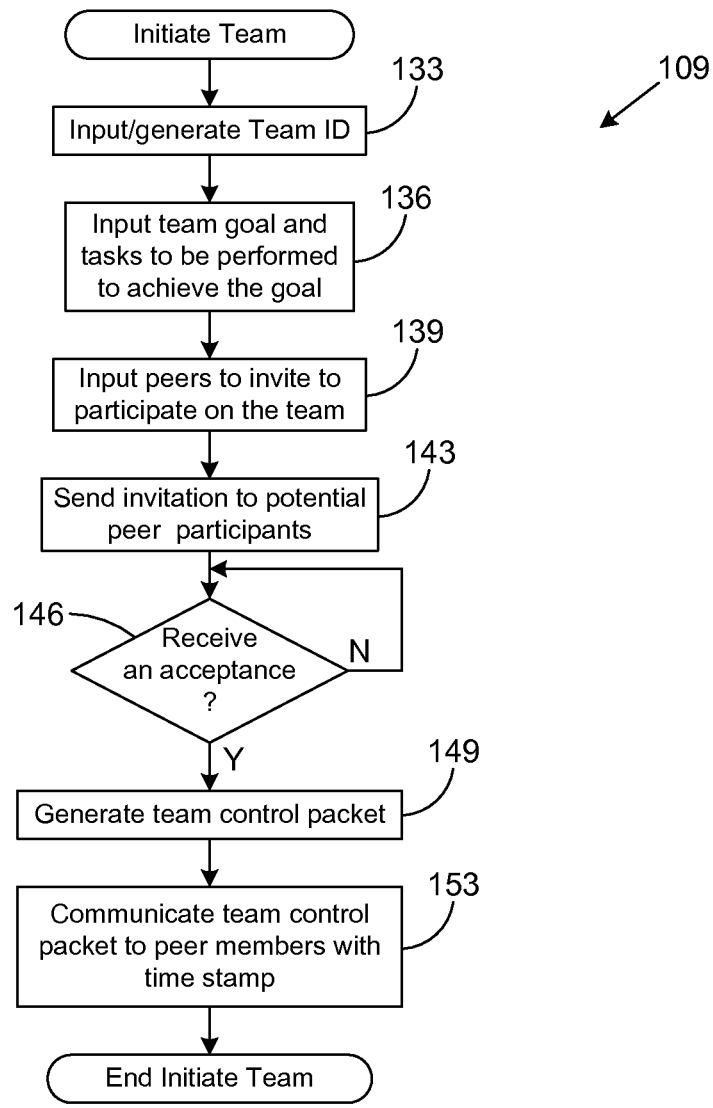
FIG. 3 is a flow chart that illustrates an example of the operation of a first portion of a team agent executed on a peer in the peer-to-peer network of FIG. 1 according to an embodiment of the present disclosure.

With reference to FIG. 3, shown is a flowchart that illustrates one example of how each of the team agents 109 may implement the creation of a peer-to-peer team according to various embodiments. Alternatively, the flowchart of FIG. 3 may be viewed as depicting steps of a method implemented in each of the peer-to-peer nodes 103.

Beginning with box 133, the team agent 109 inputs and/or generates a team identifier for the peer-to-peer team to be created. In this respect, the team agent 109 may present various user interfaces that may be manipulated by a user to receive the appropriate input as can be appreciated. Thereafter, in box 136, the team agent 109 inputs the joint goal and the tasks to be performed to achieve the joint goal.

Then, in box 139, the team agent 109 inputs the specific peer nodes 103 to invite to participate on the peer-to-peer team. In this respect, the team agent 109 facilitates the user entering specific peer nodes 103 associated with specific individuals to create a closed peer-to-peer team that is restricted to a predefined list of individuals. Alternatively, the team agent 109 may not specify a particular list of individuals, where box 139 is eliminated. As such, the invitation is sent to propagate on the peer-to-peer network 100 (FIG. 1) in an open invitation to users manipulating various peer nodes 103 to join the peer-to-peer team.

Next, in box 143, the invitation is sent to the potential participants by being transmitted to the respective peer nodes 103 identified in box 139. Alternatively, the same invitation may be sent indiscriminately to all peer nodes 103 of which the team agent 109 is aware as described above. Then, in box 146, the team agent 109 waits to receive an acceptance from at least one other peer node 103. In one embodiment, the team agent 109 may be directed to assign a task to the peer node 103 that has accepted the invitation. Alternatively, the invitation may list the various tasks that an accepting peer node 103 may select.

Once a single invitation is accepted, then the peer-to-peer team exists in that at least two peer-to-peer nodes 103 are included in the peer-to-peer team. However, it may also be the case that a minimum number or quorum of participants is needed for a given peer-to-peer team to begin to function. As such, an originating team agent 109 may input the minimum number of individuals needed for a given peer-to-peer team. In this respect, in box 146, the team agent 109 may wait to determine whether the requisite number of peer nodes 103 have accepted the invitation in order to form the peer-to-peer team. Note that in receiving an acceptance of an invitation, each team agent 109 is configured to transmit the acceptance to the team agent 109 that originated the invitation.

Once the requisite number of peer nodes 103 have accepted an invitation to join a peer-to-peer team, then in box 149, the team agent 109 generates a team control packet that includes a description of the joint goal, a peer-to-peer team identifier, and a listing of each of the peer nodes 103 associated with the peer-to-peer team. Also, each of the tasks assigned to the respective team members may be included in the team control packet.

Once the team control packet has been created by the respective team agent 109, then in box 153 the originating team agent 109 is configured to communicate an initial team control packet to the peer nodes 103 that are included in the peer-to-peer team. Also, time stamps are included with the information in the team control packets to indicate the age of the information.

In this respect, each of the peer nodes 103 preferably includes a clock that is synchronized with the clocks of all the other peer nodes 103 in the peer-to-peer team. This is so that time stamps generated by respective peer nodes 103 are relevant to the other peer nodes 103 in determining which data that may be exchanged back and forth is the most current. Once the initial team control packet is successfully communicated to the peer nodes 103 included in the peer-to-peer team, then the team agent 109 ends the initiation phase of the peer-to-peer team as shown.

Figure 4A:
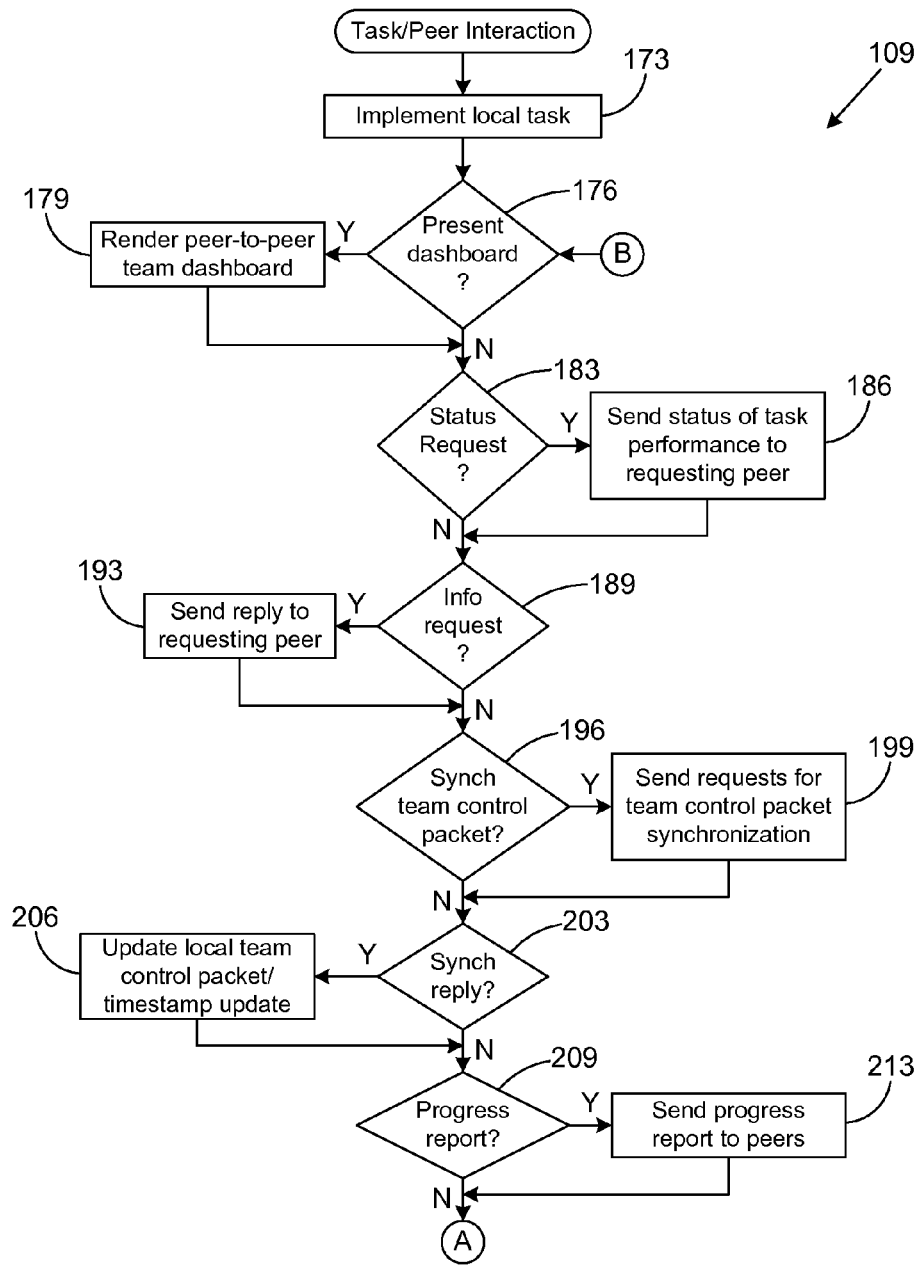
FIGS. 4A and 4B show a flow chart that illustrates an example of the operation of a second portion of a team agent executed on a peer in the peer-to-peer network of FIG. 1 according to an embodiment of the present disclosure.
Figure 4B:
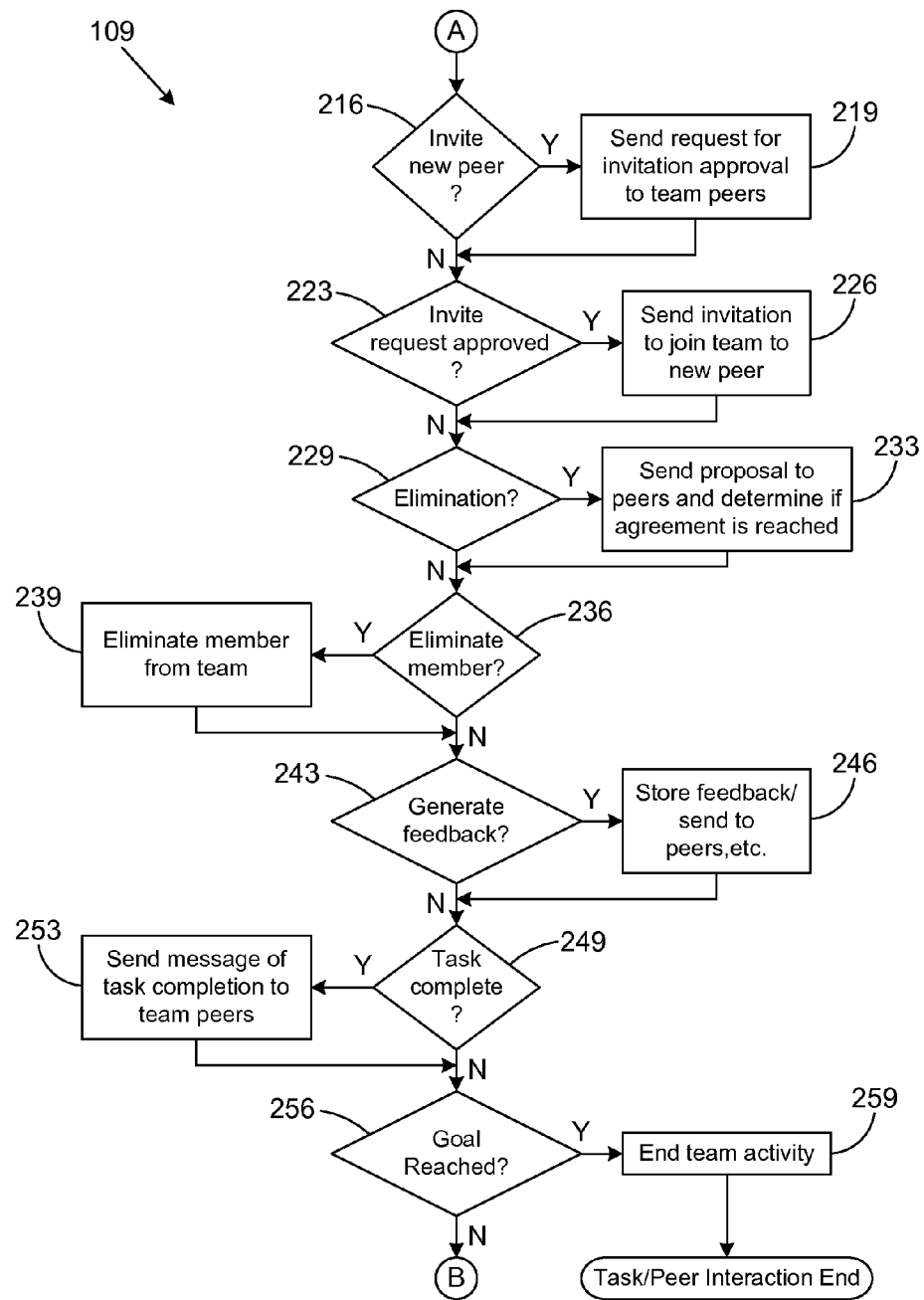

With reference to FIGS. 4A and 4B, shown is a flowchart that further illustrates various examples of functions of the team agents 109 according to various embodiments. Alternatively, the flowchart of FIGS. 4A and 4B may be viewed as depicting steps of a method implemented in the respective nodes 103 (FIG. 1). The flowchart of FIGS. 4A and 4B provides one example of the operation of a team agent 109 in performing the various operations on a given node 103 while the peer-to-peer team works together to achieve the joint goal. While various functions are described with particularity below, it is understood that other functions not specifically described herein may be included as well. In general, the flowchart of FIGS. 4A and 4B describe a ladder logic approach in which the team agent 109 continually cycles through various decision blocks and reacts when an appropriate input or event occurs as will be described.

To begin, in box 173, the team agent 109 implements a local task that has either been assigned to the respective peer node 103, or that tracks the progress of the task that has been assigned to the user of the peer node 103. In this respect, the local task implemented may comprise, for example, functionality necessary to allow a user to enter progress of their performance of a task that is implemented entirely independent of the node 103. Alternatively, the user may execute various applications on the respective peer node 103 to perform the task assigned thereto and may then interface with the team agent 109 to update progress of the task. In still another embodiment, the team agent 109 may be configured to interface directly with an application executed in the peer node 103 in order to automatically ascertain the status of the performance of the task on the part of the individual who manipulates the node 103.

Next, in box 179, the team agent 109 determines whether it should present a user interface or dashboard to a user to show the information contained within the team control packet stored within the node 103. If so, then the team agent 109 proceeds to box 179 in which a peer-to-peer team dashboard is rendered on a display device associated with the node. Thereafter, the team agent 109 proceeds to box 183. If no dashboard is to be presented as determined in box 176, then the team agent 109 also proceeds to box 183.

In box 183, the team agent 109 determines whether it has received a request from another one of the peer nodes 103 included within the peer-to-peer team. If so, the team agent 109 proceeds to box 186 in which a reply is generated that communicates the status of the task performed by the receiving node 103 that is then sent to the requesting node over the peer-to-peer network 100. In generating the response to the status request, the team agent 109 may also include a time stamp that provides an indication as to the time when the information is generated and sent to the requesting node 103. Thereafter, the team agent 109 proceeds to box 189. Also, in box 183, if there is no status request to act upon, then the team agent 109 proceeds to box 189.

In box 189, the team agent 109 determines whether an information request has been received from a respective peer node 103 in the peer-to-peer team. Such an information request may involve information needed by the respective peer node 103 in order to perform its respective task. Such information may be generated based upon the performance of the task of the peer node 103 to which the request was sent. Assuming that an information request was received, then the team agent 109 proceeds to box 193 in which a reply to the request is generated that includes the information along with a time stamp. The reply is then transmitted to the requesting peer node 103. Thereafter, the team agent 109 proceeds to box 196. Also, if there is no information request received at box 189, then the team agent 109 proceeds to box 196.

In box 196, the team agent 109 determines whether the team control packet stored within the respective peer node 103 is to be synchronized with the information in all of the team control packets of the other peer nodes 103 included in the peer-to-peer team. If so, then the team agent 109 proceeds to box 199 in which requests for copies of the team control packets from each of the other peer nodes 103 are sent to the respective peer nodes 103 in order to obtain up to date information to synchronize the team control packet in the current peer node 103. Thereafter, the team agent 109 proceeds to box 203 as shown.

If in box 196 the team agent 109 determines that there is no need to synchronize the team control packet with the team control packets of the other peer nodes 103 in the peer-to-peer team, then the team agent 109 proceeds to box 203 as shown. Note that the team agent 109 may determine whether synchronization is necessary based on various criteria. For example, the team agent may implement a schedule whereby synchronization is performed periodically at predetermined time intervals. Alternatively, synchronization may occur based upon the occurrence of respective events during the course of performing their respective tasks by each of the various peers nodes 103 in the peer-to-peer team. Synchronization is preferable to exchange information between respective peer nodes 103 in a peer-to-peer team where the information contained within the team control packets is extensive, or for other reasons as can be appreciated.

In box 203, the team agent 109 determines whether it has received a request for team control packet synchronization from another one of the peer nodes 103 such that the respective peer node 103 needs to generate a synchronization reply. If so, then the team agent 109 proceeds to box 206 in which the respective peer node 103 generates a reply to the synchronization request including the pertinent information from the team control packet. Also, a time stamp is associated with the respective information in the team control packet that is sent in response to the synchronization request.

Note when time stamps are associated with such information, a time stamp may be associated with each individual entry within the information sent, or a single time stamp may be associated with all of the information. Regardless of how such time stamp is sent, each of the team agents 109 in a respective peer node is configured to maintain a proper time stamp for all of the individual elements stored within the team control packet. This is because only certain nodes are going to be capable of providing information relevant to them and the information they provide relative to other nodes 103 may be out of date with respect to the actual information in such other nodes 103.

Once the reply to the request for synchronization generated in box 206 is sent to the requesting peer node 103, then the team agent 109 proceeds to box 209. Also, if a synchronization request is not received that requires a reply in box 203, then the team agent 109 also proceeds to box 209 as shown.

In box 209, the team agent 109 determines whether it is to generate a progress report that details the progress made by the current peer node 103 in performing the respective task. Such a progress report is to be generated and sent to the peer nodes 103 included in the peer-to-peer team. This may be an alternative to synchronization. If a progress report is to be sent, then the team agent 109 proceeds to box 213 in which the progress report is created and sent to the peer nodes 103 in the peer-to-peer team. Thereafter, the team agent 109 proceeds through connector A to box 216.

If no progress report is to be sent in box 209, then the team agent 109 proceeds to box 216 as well. It should be noted that various mechanisms may be employed to determine whether a progress report is sent. For example, progress reports may be transmitted periodically according to predefined time intervals. Also, progress reports may be sent based upon an occurrence of events during the course of the implementation of tasks in the respective peer nodes 103, or based on other criteria.

Next, in box 216, the team agent 109 determines whether a new peer 103 is to be invited to an existing peer-to-peer team. The team agent 109 may make this determination based upon appropriate user input entered into the respective peer node 103 by manipulating appropriate components of a user interface or other input as can be appreciated. Assuming that an invitation for a new peer is to be generated and sent, then in box 219, the team agent 109 sends a request for invitation approval to the other peer nodes 103 included within the peer-to-peer team. This is because one should normally not invite a new team member unless the other team members give consent.

The request then is sent to the remaining peer nodes 103 within the peer-to-peer team. Thereafter, the team agent 109 proceeds to box 223. If no invitation is to be generated in box 216, then the team agent 109 proceeds to box 223. In box 223, the team agent 109 determines whether the other peer nodes 103 have approved the request to invite the new member to the peer-to-peer team. This may be determined, for example, by tracking the number of replies from a respective peer node 103 indicating a positive or negative response to the request for invitation approval transmitted in box 219. Assuming that the invitation request was approved as determined in box 223, then the team agent 109 proceeds to box 226 in which an invitation is sent to the peer node 103 of the potential new member to join the peer-to-peer team.

If a positive reply to the invitation is received, then the new peer node 103 is added to the peer-to-peer team and an appropriate task is assigned to such peer node 103. Also, the assignment of the task and other information about the new peer node 103 is transmitted to all of the other peer nodes in the peer-to-peer team. Thereafter, the team agent 109 proceeds to box 229 as shown.

If the invitation request was not approved in box 223, then the team agent 109 proceeds to box 229. In box 229, the team agent 109 determines whether a given peer node 103 should be eliminated from the peer-to-peer team. This may be determined based upon appropriate input provided by a user of the respective peer node 103. Assuming that a given peer node is targeted for elimination from the peer-to-peer team in box 229, then the team agent 109 proceeds to box 233 in which a proposal for elimination of the targeted peer node 103 is generated and transmitted to the peer nodes 103 other than the peer node 103 targeted for elimination. The proposal for elimination is sent to determine if agreement can be reached among the other peer nodes 103 that the targeted peer node 103 should be eliminated. A peer node 103 may be targeted for elimination due to any one of a number of reasons such as, for example, poor performance of an assigned task, unacceptable behavior (i.e. use of profanity, undue aggression, social issues), and other reasons.

This reflects the fact that it is desirable to achieve agreement from all members of a given peer-to-peer team before a given individual peer node 103 is eliminated therefrom. Alternatively, in may only be necessary to obtain agreement on the part of a threshold number of members of a peer-to-peer team. Thereafter, the team agent 109 proceeds to box 236. Also, if there is no indication in box 229 that a given peer node 103 should be eliminated from the peer-to-peer team, then the team agent 109 proceeds to box 236. In box 236, the team agent 109 determines whether the respective peer nodes 103 agree that the peer node 103 targeted for elimination should in fact be eliminated. This determination may be made by tracking the receipt of approvals from all of the respective peer nodes to which the proposal was sent in box 233 for elimination. Assuming that a respective peer node 103 is to be eliminated, the team agent 109 proceeds to box 239. If the determination cannot currently be made to eliminate a target peer node 103 in box 236, then the team agent 109 proceeds to box 243.

In box 239, the team agent 109 takes such steps as to begin to eliminate or to actually eliminate the targeted peer node 103 from the peer-to-peer team. In this respect, a notification may be sent to such peer node that they have been eliminated from the peer-to-peer team based upon agreement between all of or at least a threshold number of their counterpart peer nodes 103 within the peer-to-peer team as described above with reference to box 233. Of course, this may result in negotiation and other steps taken by respective users of the respective peer nodes 103 in order to come to some sort of resolution outside of the operation of the team agents 109 as to whether such members should be eliminated from the peer-to-peer team.

However, in an additional embodiment, the individual peer node 103 may automatically be eliminated from the peer-to-peer team. This provides incentive of peer nodes 103 to make sure they perform their tasks in an efficient manner so as not to potentially be eliminated from a given team. Also, if a given peer node constantly instigates elimination of members of a peer-to-peer team without justification, then feedback will ultimately result that might cause such an individual to be barred from future peer-to-peer teams.

In order to eliminate a given member from a peer-to-peer team, each of the respective team agents 109 takes such steps so as to remove the information about the targeted peer node 103 from their respective team control packets. Also, all future communication with respect to the eliminated peer node 103 may be ceased and such eliminated peer nodes 103 are barred from participation. Alternatively, the peer node 103 targeted for elimination can be retained and marked in some way for permanent removal or marked for a probationary period of time, etc. Thereafter, the team agent 109 proceeds to box 243.

In box 243, the team agent 109 determines whether a user has indicated that they wish to enter feedback with respect to the performance of a given peer node 103. This may be determined by detecting whether the user has manipulated appropriate user interface components indicating that they wish to generate feedback for a respective node 103. Assuming feedback is to be generated in box 243, then the team agent 109 proceeds to box 246 in which the feedback is generated using appropriate user interfaces and stored in the peer node 103 in association with information about the respective peer node 103 for which the feedback is generated. Also, the feedback may be generated and sent to the respective peer nodes 103 within the peer-to-peer team. Thereafter, the team agent 109 proceeds to box 249. Also, if the team agent 109 determines in box 243 that there is no feedback to be generated and sent, then the team agent 109 proceeds to box 249.

In box 249, the team agent 109 determines whether its respective task has been completed. If so, then the team agent 109 proceeds to box 253 in which a message indicating the completion of the respective task is generated and communicated to the remaining peer nodes 103 of the peer-to-peer team. Thereafter, the team agent 109 proceeds to box 256. Similarly, if in box 249 the team agent 109 has determined that the task is not yet complete, it proceeds to box 256.

In box 256, the team agent 109 determines whether the joint goal has been reached and the function of the peer-to-peer team has completed. If so, then team agent 109 proceeds to box 259 in which the team activity is ended. In this respect, all results that need to be communicated among the respective peer nodes 103 are shared accordingly. Also, the respective peer nodes 103 cease all activities relative to the functioning of the peer-to-peer team and take any other steps as is necessary under the circumstances. Thereafter, this portion of the functionality of the team agent 109 ends as shown.

However, in box 256, if the joint goal has not yet been reached, then the team agent 109 proceeds through connector B to box 176 to recycle though the decision boxes as shown.

Figure 5:
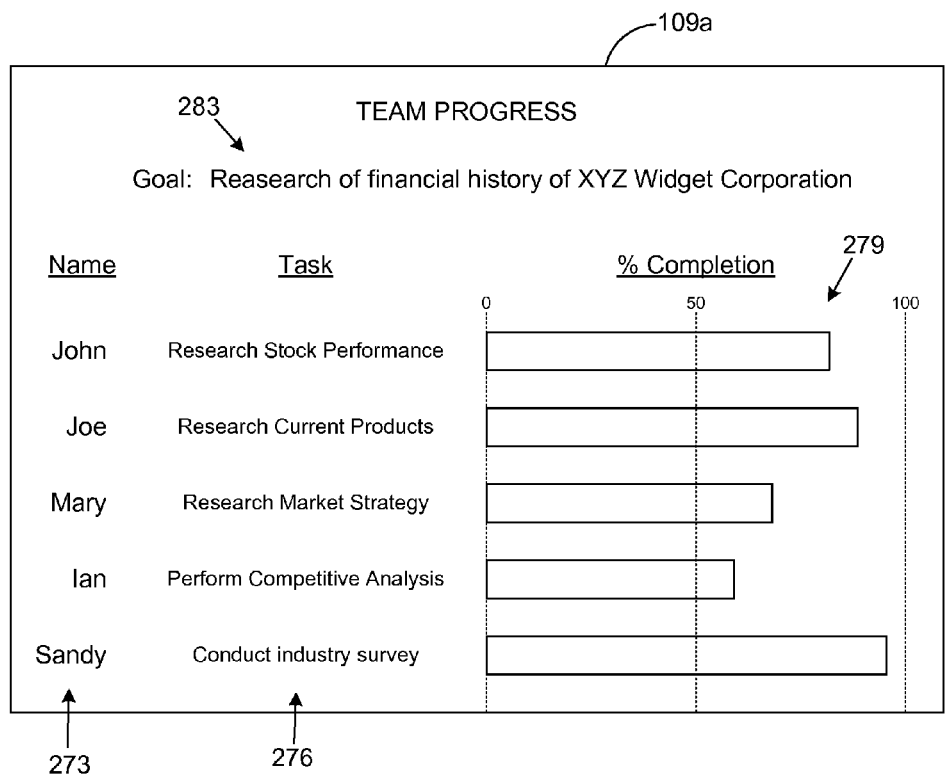
FIG. 5 is a drawing of a user interface rendered on a node in the peer-to-peer network of FIG. 1 according to an embodiment of the present disclosure.

With reference to FIG. 5, shown is one example of a user interface 109a that may be generated by the respective team agents 109 during the course of the pursuit of the joint goal. As shown, the names of the respective users 273 associated with the respective peer nodes 103 are listed. Also, the tasks 276 associated with each one of the peer nodes 103 are listed as well as an indication 279 of the progress of each of the respective peer nodes 103 in completing the respective tasks 276. Also, the joint goal 283 is indicated.

In addition, other information may be displayed as part of the user interface 109a, where the user interface 109a is presented as an example. Specifically, addresses, background of the users 273, tools used by the respective users 273, or other information may be provided. Also, other graphical components may be employed beyond the bar graphs indicating the percent completion of the respective tasks 276.

Figure 6:
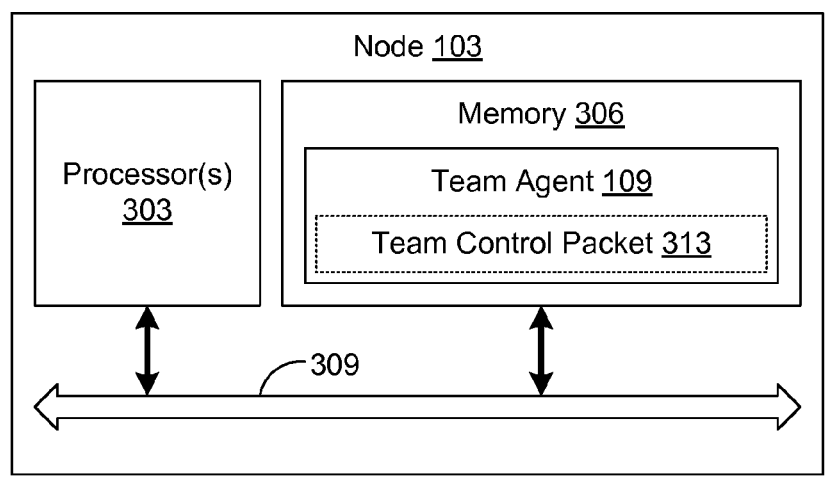
FIG. 6 is a block diagram of one example embodiment of a node in the peer-to-peer network of FIG. 1 according to an embodiment of the present disclosure.

With reference to FIG. 6, shown is one example of a peer node 103 according to an embodiment of the present disclosure. The peer node 103 may include one or more processor circuits having a processor 303 and a memory 306, both of which are coupled to a local interface 309. In this respect, the local interface 309 may comprise, for example, a data bus with an accompanying control/address bus as can be appreciated. The peer node 103 may comprise, for example, a computer system, personal digital assistant, or other system as can be appreciated.

Stored on the memory 306 and executable by the processor 303 are various components such as an operating system (not shown) and the team agent 109. The team agent 109 is configured to maintain the team control packet 313 in the memory 306. In addition, it is understood that many other components may be stored in the memory 306 and executable by the processor 303.

As set forth above, with reference to FIG. 6, a number of components may be stored in the memory 306 are executable by the processor 303. In this respect, the term "executable"

refers to a program file that is in a form that can ultimately be run by the processor 303. Examples of executable programs may be, for example, a compiled program that can be translated into machine code in a format that can be loaded into a random access portion of the memory 306 and run by the processor 303. Executable programs may also be source code that may be expressed in proper format such as object code that is capable of being loaded into a random access portion of the memory 306 and executed by the processor 303. An executable program may be stored in any portion or component of the memory 306 including, for example, random access memory, read-only memory, a hard drive, compact disk (CD), floppy disk, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors and the memory 306 may represent multiple memories that operate in parallel processing circuits, respectively. In such a case, the local interface 309 may be an appropriate network that facilitates communication between any two of the multiple processors, between any processor and any of the memories, or between any two of the memories, etc. The processor 303 may be of electrical or optical construction, or of some other construction as can be appreciated by those with ordinary skill in the art.

Although various functionality of the team agent 109 is described as being embodied in software or code executed by general purpose hardware as set forth above, as an alternative the same may also be embodied in dedicated hardware or a combination of software/general purpose hardware and dedicated hardware. If embodied in dedicated hardware, the functionality of the team agent 109 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagrams, user interfaces, and/or the flow charts of FIGS. 3-6 show the architecture, functionality, and operation of an example of the team agent 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 3, 4A, and 4B show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the team agent 109 is expressed in the form of software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the team agent 109 for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are possible examples of implementations, merely set forth for a clear understanding of the principles of the disclosure. Many variations and modifications may be made to the above-described embodiment(s) of the disclosure without departing substantially from the spirit and principles of the present disclosure. All such modifications and variations are intended to be included herein within the scope of this disclosure and protected by the following claims.

Therefore, having thus described the invention, at least the following is claimed:

1. A method, comprising:
   operating one of a plurality of peers included in a peer-to-peer team established to accomplish a joint goal;
   facilitating data communication between the one of the peers and the remaining ones of the peers via a peer-to-peer network;
   storing a team control packet in the one of the peers, the team control packet indicating a performance of each of the peers in the peer-to-peer team in performing a respective one of a plurality of tasks to achieve the joint goal;

propagating an invitation on the peer-to-peer network to join the peer-to peer team; and receiving an acceptance of the invitation from each of the remaining ones of the peers to join the peer-to-peer team.

2. The method of claim 1, further comprising specifying the joint goal of the peer-to-peer team in the one of the peers.

3. The method of claim 2, further comprising allowing each of the remaining ones of the peers to select a respective one of the tasks to perform.

4. The method of claim 2, further comprising sending a message from a given one of the peers to the remaining ones of the peers in the peer-to-peer team upon an acceptance of the invitation to join the peer-to-peer team by the given one of the peers, the message informing the remaining ones of the peers of the acceptance by the given one of the peers.

5. The method of claim 1, further comprising associating a team identifier with each one of the peers in the peer-to-peer team.

6. The method of claim 1, further comprising:
periodically generating a progress report that indicates a progress of the one of the peers in performing a respective one of the tasks; and
sending the progress report from the one of the peers to the remaining ones of the peers.

7. The method of claim 1, further comprising:
specifying the joint goal of the peer-to-peer team in the one of the peers; and
establishing the peer-to-peer team in the one of the peers by inviting the remaining ones of the peers to participate in the peer-to-peer team.

8. The method of claim 1, where each of the peers performs a respective one of the tasks independent of the performance of the tasks by other ones of the peers.

9. The method of claim 1, where each of the peers performs a respective one of the tasks in cooperation of the performance of the tasks by other ones of the peers, where the tasks are interdependent.

10. The method of claim 1, further comprising sending a status request generated in the one of the peers to the remaining ones of the peers to obtain a status of the performance of the respective tasks in each of the remaining ones of the peers.

11. The method of claim 1, further comprising sending a request generated in the one of the peers to another one of the peers for predefined data needed to perform a respective one of the tasks in the one of the peers.

12. The method of claim 1, further comprising facilitating cooperation among the peers included in the peer-to-peer team to eliminate at least one peer from the peer-to-peer team.

13. The method of claim 1, further comprising displaying, in each of the peers, a status of each of the peers included in the peer-to-peer team in performing a respective one of the tasks.

14. The method of claim 1, further comprising:
inputting a performance feedback in at least one of the peers, the performance feedback relating to at least another one of the peers; and
storing the performance feedback relating to the at least one of the peers for future reference in engaging with the at least one of the peers in a future peer-to-peer team.

15. A system, comprising:
a peer device configured to be coupled to a peer-to-peer network; and
a peer-to-peer team application implemented on the peer device, the peer-to-peer team application being configured to:
facilitate establishing a joint goal for a peer-to-peer team and associate a team identifier with the peer-to-peer team, the peer-to-peer team including the peer device and at least one other peer device;
facilitate communication between the peer device and the at least one other peer device via the peer-to-peer network;
maintain a team control packet that indicates a performance of the peer device and the at least one other peer device included in the peer-to-peer team;
track an implementation of a task associated with the peer device, the task being configured to achieve the joint goal in concert with an implementation of at least one other task associated with the at least one other peer device;
periodically generate a progress report that indicates a progress of the performance of the task;
send the progress report from the peer device to the at least one other peer device;
propagate an invitation on a peer-to-peer network to join the peer-to-peer team; and
receive an acceptance from the at least one other peer device to join the peer-to peer team.

16. The system of claim 15, wherein the task is performed independent of the at least one other task.

17. The system of claim 15, wherein the task is performed in cooperation with a performance of the at least one other task, where the task and the at least one other task are interdependent.

18. A system, comprising:
a peer device configured to be coupled to a peer-to-peer network; and
a peer-to-peer team application implemented on the peer device, the peer-to-peer team application being configured to:
facilitate establishing a joint goal for a peer-to-peer team, the peer-to-peer team including the peer device and at least one other peer device;
facilitate communication between the peer device and the at least one other peer device via the peer-to-peer network;
maintain a team control packet that indicates a performance of the peer device and the at least one other peer device included in the peer-to-peer team;
track an implementation of a task associated with the peer device, the task being configured to achieve the joint goal in concert with an implementation of at least one other task associated with the at least one other peer device;
propagate an invitation on the peer-to-peer network to join the peer-to-peer team; and
receive an acceptance of the invitation from the at least one other peer device to join the peer-to-peer team.

19. The system of claim 18, wherein the peer-to-peer team application is further configured to associate a team identifier with the peer-to peer team.

20. The system of claim 18, wherein the task is performed independent of the at least one other task.

21. The system of claim 18, wherein the task is performed in cooperation with a performance of the at least one other task, where the task and the at least one other task are interdependent.

22. The system of claim 18, wherein the peer-to-peer team application is further configured to:

periodically generate a progress report that indicates a progress of the performance of the task; and send the progress report from the peer device to the at least one other peer device.

23. The system of claim 18, wherein the peer-to-peer team application is further configured to establish the peer-to-peer team in the peer device by inviting the at least one other peer device to participate in the peer-to-peer team.

24. The system of claim 18, wherein the invitation is further configured to allow each of the at least one other peer device to select the at least one other task to perform.

* * * * *